US006591150B1

(12) United States Patent
Shirota

(10) Patent No.: US 6,591,150 B1
(45) Date of Patent: Jul. 8, 2003

(54) REDUNDANT MONITORING CONTROL SYSTEM, MONITORING CONTROL APPARATUS THEREFOR AND MONITORED CONTROL APPARATUS

(75) Inventor: Masahiko Shirota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 09/625,463

(22) Filed: Jul. 25, 2000

(30) Foreign Application Priority Data

Sep. 3, 1999 (JP) .......................................... 11-250040

(51) Int. Cl.[7] ................................................ G05B 9/02
(52) U.S. Cl. .............................. 700/82; 700/3; 714/11; 340/3.1
(58) Field of Search ........................... 700/82, 79, 2–3; 714/11; 340/3.1–3.2; 712/31; 318/563–565

(56) References Cited

U.S. PATENT DOCUMENTS

| 5,008,805 A | * | 4/1991 | Fiebig et al. ................. 700/79 |
| 5,086,384 A | * | 2/1992 | Fukada ......................... 700/82 |
| 5,202,822 A | * | 4/1993 | McLaughlin et al. ......... 700/82 |
| 5,751,220 A | * | 5/1998 | Ghaffari ................. 340/825.21 |
| 5,777,874 A | * | 7/1998 | Flood et al. ................... 700/82 |
| 6,272,386 B1 | * | 8/2001 | McLaughlin et al. ......... 700/82 |

FOREIGN PATENT DOCUMENTS

| JP | 3-71346 | 3/1991 | .......... G06F/11/30 |
| JP | 8-265319 | 10/1996 | |
| JP | 10-150457 | 6/1998 | .......... H04L/12/42 |

* cited by examiner

*Primary Examiner*—Emanuel Todd Voeltz
*Assistant Examiner*—Crystal J. Barnes
(74) *Attorney, Agent, or Firm*—Katten Muchin Zavis Rosenman

(57) ABSTRACT

A redundant monitoring control system includes at least one monitored control apparatus forming a communication network, and a plurality of monitoring control apparatuses monitoring and controlling the monitored control apparatus. The monitored control apparatus switches a monitoring and control of the monitored control apparatus by a monitoring control apparatus of a working system to a monitoring control apparatus of a backup system in response to a disconnection from the monitoring control apparatus of the working system which is detected when the monitoring control apparatus of the working system fails. The monitoring control apparatus of the backup system recognizes a control operation carried out by the monitoring control apparatus of the working system until the switching, and carries out a remainder of the recognized control operation with respect to the monitored control apparatus.

5 Claims, 17 Drawing Sheets

FIG. 6

| APPARATUS NAME | OWN IP ADDRESS | IP ADDRESS OF EACH COMMUNICATION DESTINATION |
|---|---|---|
| OMCR1 | IPADDR_OMCR1 | IPADDR_BSC1,...,IPADDR_BSCn |
| OMCR2 | IPADDR_OMCR2 | IPADDR_BSC1,...,IPADDR_BSCn |
| BSC1 | IPADDR_BSC1 | #1:IPADDR_OMCR1,#2:IPADDR_OMCR2 |
| ... | ... | ... |
| BSCn | IPADDR_BSCn | #1:IPADDR_OMCR1,#2:IPADDR_OMCR2 |

FIG. 9

| APPARATUS NAME | OWN IP ADDRESS | IP ADDRESS OF EACH COMMUNICATION DESTINATION |
|---|---|---|
| OMCR1 | IPADDR_OMCR1 | IPADDR_OMCR2,IPADDR_BSC1,...,IPADDR_BSCn |
| OMCR2 | IPADDR_OMCR2 | IPADDR_OMCR1,IPADDR_BSC1,...,IPADDR_BSCn |
| BSC1 | IPADDR_BSC1 | #1:IPADDR_OMCR1,#2:IPADDR_OMCR2 |
| ... | ... | ... |
| BSCn | IPADDR_BSCn | #1:IPADDR_OMCR1,#2:IPADDR_OMCR2 |

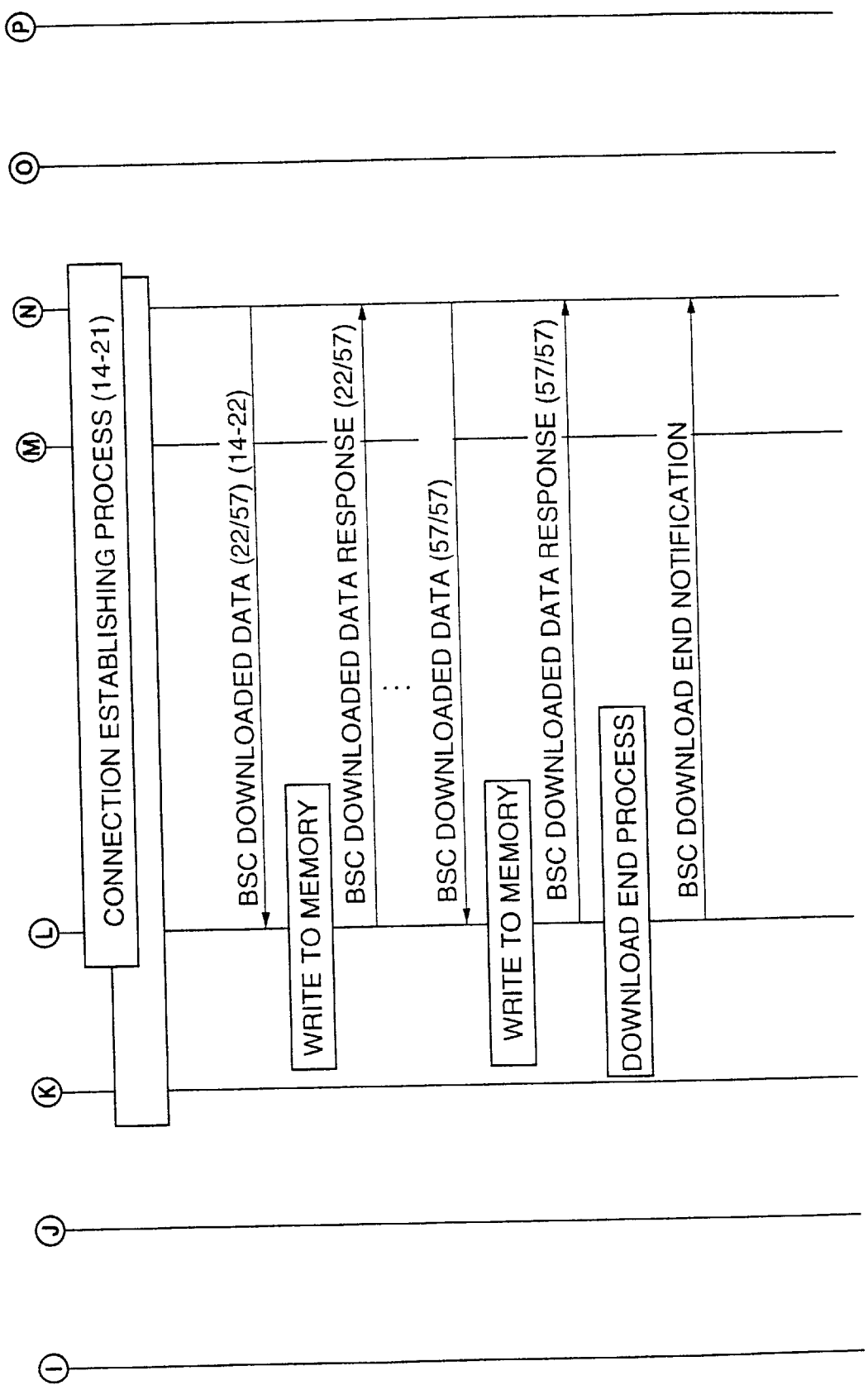

FIG. 15

| STATE | GENERATED EVENT | OMCR1 | OMCR2 | OMCR3 | OMCR4 |
|---|---|---|---|---|---|
| 1 | INITIAL STATE | BSC1,BSC2 | (BACKUP SYSTEM FOR OMCR1) | BSC3,BSC4 | (BACKUP SYSTEM FOR OMCR3) |
| 2 | FAILURE GENERATED IN OMCR1 | × DURING FAILURE | BSC1,BSC2 | BSC3,BSC4 (BACKUP SYSTEM FOR OMCR2) | (BACKUP SYSTEM FOR OMCR3) |
| 3 | FAILURE GENERATED IN OMCR2 | × DURING FAILURE | × DURING FAILURE | BSC1,BSC2 BSC3,BSC4 | (BACKUP SYSTEM FOR OMCR3) |
| 4 | FAILURE GENERATED IN OMCR3 | × DURING FAILURE | × DURING FAILURE | × DURING FAILURE | BSC1,BSC2 BSC3,BSC4 |

FIG. 16

| APPARATUS NAME | OWN IP ADDRESS | IP ADDRESS OF EACH COMMUNICATION DESTINATION ("IPADDR_" OMITTED) |
|---|---|---|
| OMCR1 | IPADDR_OMCR1 | OMCR2,4,BSC1,2,3,4<br>(ITEMS OF USE)<br>[FOR WHEN OMCR3 IS NORMAL (MONITOR & CONTROL BSC1,2)] OMCR2,BSC1,2<br>[FOR WHEN OMCR3 FAILS (OPERATE AS BACKUP SYSTEM FOR OMCR4)] OMCR2,4,BSC1,2<br>[FOR WHEN OMCR3,4 FAILS (MONITOR & CONTROL BSC1,2,3,4)] OMCR2,BSC1,2,3,4 |
| OMCR2 | IPADDR_OMCR2 | OMCR1,3,BSC1,2,3,4<br>(ITEMS OF USE)<br>[FOR WHEN OMCR1 IS NORMAL (OPERATE AS BACKUP SYSTEM FOR OMCR1)] OMCR1<br>[FOR WHEN OMCR1 FAILS (MONITOR & CONTROL BSC1,2)] OMCR3,BSC1,2<br>[FOR WHEN OMCR1,3,4 FAILS] BSC1,2,3,4 |
| OMCR3 | IPADDR_OMCR3 | OMCR2,4,BSC1,2,3,4<br>(ITEMS OF USE)<br>[FOR WHEN OMCR1 IS NORMAL (MONITOR & CONTROL BSC3,4)] OMCR4,BSC3,4<br>[FOR WHEN OMCR1 FAILS (OPERATE AS BACKUP SYSTEM FOR OMCR2)] OMCR2,4,BSC3,4<br>[FOR WHEN OMCR1,2 FAILS (MONITOR & CONTROL BSC1,2,3,4)] OMCR4,BSC1,2,3,4 |
| OMCR4 | IPADDR_OMCR4 | OMCR1,3,BSC1,2,3,4<br>(ITEMS OF USE)<br>[FOR WHEN OMCR3 IS NORMAL (OPERATE AS BACKUP SYSTEM FOR OMCR3)] OMCR3<br>[FOR WHEN OMCR3 FAILS (MONITOR & CONTROL BSC3,4)] OMCR1,BSC3,4<br>[FOR WHEN OMCR1,2,3 FAILS] BSC1,2,3,4 |

FIG. 17

| APPARATUS NAME | OWN IP ADDRESS | IP ADDRESS OF EACH COMMUNICATION DESTINATION ("IPADDR_" OMITTED) |
|---|---|---|
| BSC1 | IPADDR_BSC1 | OMCR1,2,3,4<br>(ITEMS OF USE)<br>[FOR WHEN OMCR1 IS NORMAL (CONNECT TO OMCR1)] OMCR1<br>[FOR WHEN OMCR1 FAILS (CONNECT TO OMCR2)] OMCR2<br>[FOR WHEN OMCR1,2 FAILS (CONNECT TO OMCR3)] OMCR3<br>[FOR WHEN OMCR1,2,3 FAILS (CONNECT TO OMCR4)] OMCR4 |
| BSC2 | IPADDR_BSC2 | OMCR1,2,3,4<br>(ITEMS OF USE)<br>[FOR WHEN OMCR1 IS NORMAL (CONNECT TO OMCR1)] OMCR1<br>[FOR WHEN OMCR1 FAILS (CONNECT TO OMCR2)] OMCR2<br>[FOR WHEN OMCR1,2 FAILS (CONNECT TO OMCR3)] OMCR3<br>[FOR WHEN OMCR1,2,3 FAILS (CONNECT TO OMCR4)] OMCR4 |
| BSC3 | IPADDR_BSC3 | OMCR1,2,3,4<br>(ITEMS OF USE)<br>[FOR WHEN OMCR3 IS NORMAL (CONNECT TO OMCR3)] OMCR3<br>[FOR WHEN OMCR3 FAILS (CONNECT TO OMCR4)] OMCR4<br>[FOR WHEN OMCR3,4 FAILS (CONNECT TO OMCR1)] OMCR1<br>[FOR WHEN OMCR1,3,4 FAILS (CONNECT TO OMCR2)] OMCR2 |
| BSC4 | IPADDR_BSC4 | OMCR1,2,3,4<br>(ITEMS OF USE)<br>[FOR WHEN OMCR3 IS NORMAL (CONNECT TO OMCR3)] OMCR3<br>[FOR WHEN OMCR3 FAILS (CONNECT TO OMCR4)] OMCR4<br>[FOR WHEN OMCR3,4 FAILS (CONNECT TO OMCR1)] OMCR1<br>[FOR WHEN OMCR1,3,4 FAILS (CONNECT TO OMCR2)] OMCR2 |

REDUNDANT MONITORING CONTROL SYSTEM, MONITORING CONTROL APPARATUS THEREFOR AND MONITORED CONTROL APPARATUS

BACKGROUND OF THE INVENTION

This application claims the benefit of a Japanese Patent Application No. 11-250040 filed Sep. 3, 1999, in the Japanese Patent Office, the disclosure of which is hereby incorporated by reference.

1. Field of the Invention

The present invention generally relates to redundant monitoring control systems, monitoring control apparatuses therefor and monitored control apparatuses, and more particularly to a redundant monitoring control system which carries out remote monitoring and control of monitored control apparatuses such as communication apparatuses which form a communication network, by switching a working one of monitoring control apparatuses which form a redundant structure. The present invention also relates to a monitoring control apparatus which includes a means of switching the monitoring control to another monitoring control apparatus, and to a monitored control apparatus which is monitored controlled by such a monitoring control apparatus.

Communication systems form a basis of society, and if a failure is generated in a communication network to interrupt a communication service, damages caused thereby spread over a wide range. For this reason, there are demands to minimize the failure in the communication systems.

In order to cope with such demands, a monitoring control apparatus is provided to constantly monitor the state of the communication network. The monitoring control apparatus detects the generation of the failure in the communication network at an early stage, and takes appropriate measures against the detected failure, so as to prevent a situation where a serious failure such as the interruption of the communication service is generated.

However, if the monitoring control apparatus itself fails, it becomes impossible to monitor the state of the communication network. Hence, in order to enable constant monitoring and control of the communication even when the monitoring control apparatus itself fails, a plurality of monitoring control apparatuses are provided to carry out the monitoring and control of the communication network by use of a redundant structure.

According to the redundant structure which uses the plurality of monitoring control apparatuses, the working monitoring control apparatus which actually monitors and controls the communication network is switched to another backup monitoring apparatus which operates normally if the working monitoring control apparatus fails, so that after the switching, the communication network is similarly monitored and controlled by the backup monitoring control apparatus.

2. Description of the Related Art

According to the conventional monitoring and control system employing the redundant structure, an operator of the monitoring control apparatus manually switches from the working monitoring control apparatus to the backup monitoring control apparatus when a failure is generated in the working monitoring control apparatus. That is, the operator manually switches the connection from the working monitoring control apparatus to the backup monitoring control apparatus, resumes the monitoring and control of the communication network by the backup monitoring control apparatus, and continues the monitoring and control operation.

On the other hand, instead of employing the redundant structure which uses the plurality of monitoring and control apparatuses, it is possible to construct the monitoring control apparatus by a high-reliability computer which can internally realize a redundant function. But in this case, it is necessary to use an expensive and special computer, which makes the hardware of the monitoring control apparatus itself expensive. As a result, the cost of the communication system as a whole which uses such an expensive monitoring control apparatus inevitably becomes high.

Because the conventional monitoring and control system which has the redundant structure by use of the plurality of monitoring control apparatuses requires the operator to manually switch from the working monitoring control apparatus to the backup monitoring control apparatus when the working monitoring control apparatus fails, it takes a relatively long time for the operator to recognize the failure of the working monitoring control apparatus, switch the connection to the backup monitoring control apparatus, resume the monitoring and control by the backup monitoring control apparatus, and continue the monitoring and control operation. Consequently, a state in which the communication network is not monitored continues for the relatively long time, thereby causing a delay in detecting a failure which is generated in the communication network during this time, and a long interruption of the control which is necessary with respect to the communication network. Therefore, the interruption and the like of the communication service is generated, and there is a problem in that the communication service deteriorates.

Particularly, it takes a long time to carry out a control operation such as downloading from the monitoring control apparatus data which are necessary to normally operate the monitored control apparatus such as a communication apparatus which forms the communication network. For this reason, such a control operation is often reserved to be carried out at a time during the night when the operator is not present. But when the monitoring control apparatus fails during such a control operation carried out at night, the operator must manually switch the working monitoring control apparatus to the backup monitoring control apparatus the next morning. Consequently, the failure of the working monitoring control apparatus cannot be corrected quickly, and there is a problem in that it is difficult to provide a stable communication service particularly during busy hours.

SUMMARY OF THE INVENTION

Accordingly, it is a general object of the present invention to provide a novel and useful redundant monitoring control system, monitoring control apparatus therefor and monitored control apparatus, in which the problems described above are eliminated.

Another and more specific object of the present invention is to provide a redundant monitoring control system, monitoring control apparatus therefor and monitored control apparatus, which can automatically switch from a working monitoring control apparatus to a backup monitoring control apparatus when a failure is generated in the working monitoring control apparatus and continue the monitoring and control operation, without the need for an operator to manually carry out such operations.

Still another object of the present invention is to provide a redundant monitoring control system comprising at least one monitored control apparatus forming a communication network, a plurality of monitoring control apparatuses monitoring and controlling the monitored control apparatus, means, provided in the monitored control apparatus, for switching a monitoring and control of the monitored control apparatus by a monitoring control apparatus of a working system to a monitoring control apparatus of a backup system in response to a disconnection from the monitoring control apparatus of the working system which is detected when the monitoring control apparatus of the working system fails, and means, provided in the monitoring control apparatus of the backup system, for recognizing a control operation carried out by the monitoring control apparatus of the working system until the switching, and carrying out a remainder of the recognized control operation with respect to the monitored control apparatus. According to the redundant monitoring control system of the present invention, the control information is transferred to one of the monitoring control apparatuses which form a redundant structure, in response to the generation of the failure in the monitoring control apparatus of the working system. In addition, the monitoring and control of the monitored control apparatus is taken over by the monitoring control apparatus of the backup system. As a result, it is possible to continue the monitoring and control of the monitored control apparatus even when the monitoring control apparatus of the working system fails, without requiring a manual operation of the maintenance operator.

The redundant monitoring control system may further comprise means, provided in the monitored control apparatus, for establishing a connection to the monitoring control apparatus of the backup system when the disconnection to the monitoring control apparatus of the working system is detected, and means, provided in the monitored control apparatus, for notifying the control operation carried out by the monitoring control apparatus of the working system until the failure to the monitoring control apparatus of the backup system.

The redundant monitoring control system may further comprise means, provided in the monitoring control apparatus of the backup system, for establishing a connection to the monitoring control apparatus of the working system and successively acquiring monitored information and control information related to the monitored control apparatus from the monitoring control apparatus of the working system, and means, provided in the monitoring control apparatus of the backup system, for monitoring a state of the monitoring control apparatus of the working system, and when a failure of the monitoring control apparatus of the working system is detected, establishing a connection with respect to the monitored control apparatus and taking over the control operation carried out by the monitoring control apparatus of the working system until the failure.

In the redundant monitoring control system, the plurality of monitoring control apparatuses which are provided with respect to each monitored control apparatus may be grouped to distribute load of processing with respect to each monitored control apparatus.

A further object of the present invention is to provide a monitored control apparatus which establishes a connection to a monitoring control apparatus of a working system and is monitored and controlled by the monitoring control apparatus of the working system, comprising means for establishing a connection to a monitoring control apparatus of a backup system when a disconnection of the connection to the monitoring control apparatus of the working system is detected, and means for notifying to the monitoring control apparatus of the backup system a control operation carried out by the monitoring control apparatus of the working system until the disconnection, so that monitoring and control of the monitored control apparatus are taken over by the monitoring control apparatus of the backup system after the disconnection.

Another object of the present invention is to provide a monitoring control apparatus for monitoring and controlling a monitored control apparatus via a connection which is established between the monitoring control apparatus and the monitored control apparatus, comprising means for receiving control information which is related to control carried out by an other monitoring control apparatus and is notified from the monitored control apparatus, and means for taking over the control carried out by the other monitoring control apparatus based on the control information.

Still another object of the present invention is to provide a monitoring control apparatus for monitoring and controlling a monitored control apparatus via a connection which is established between the monitoring control apparatus and the monitored control apparatus, comprising means for successively notifying monitored information and control information related to the monitored control apparatus to an other monitoring control apparatus of a backup system when the monitoring control apparatus operates as a working system, and means for taking over a control operation carried out by an other monitoring control apparatus of a working system with respect to the monitored control apparatus based on control information notified from the other monitoring control apparatus of the working system when the monitoring control apparatus operates as a backup system and a disconnection of the monitoring control apparatus from the other monitoring control apparatus of the working system is detected.

The monitoring control apparatus may be grouped with a plurality of monitoring control apparatuses which are provided with respect to the monitored control apparatus so as to distribute load of processing with respect to the monitored control apparatus.

Other objects and further features of the present invention will be apparent from the following detailed description when read in conjunction with the accompanying drawings.

BRIEF DESCRIPTION OF THE DRAWINGS

FIG. 6 is a diagram for explaining the IP address which is held in the operation and maintenance center radio and the base station controller in the first embodiment of the present invention;

FIG. 9 is a diagram for explaining the IP address which is held in the operation and maintenance center radio and the base station controller in a second embodiment of a present invention;

FIG. 14 is a timing diagram for explaining the operation sequence of the third embodiment of the present invention;

FIG. 15 is a diagram for explaining the corresponding relationship of the working system and the backup system of the operation and maintenance center radio in the third embodiment of the present invention;

FIG. 16 is a diagram for explaining the IP addresses which are held in the operation and maintenance center radio in the third embodiment of the present invention; and FIG. 17 is a diagram for explaining the IP addresses which are held in the base station controller in the third embodiment of the present invention.

DESCRIPTION OF THE PREFERRED EMBODIMENTS

Figure 1:
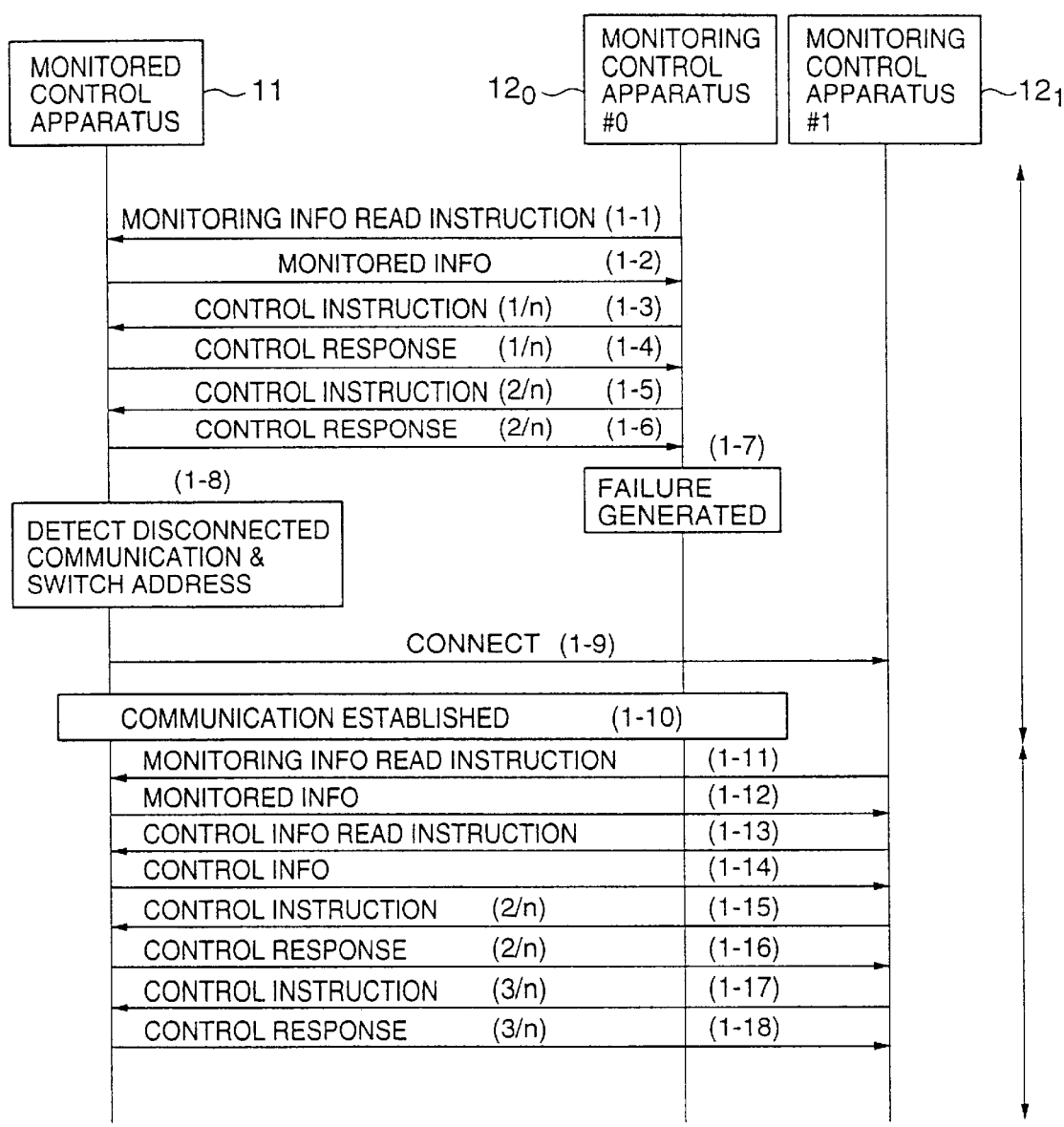
FIG. 1 is a timing diagram for explaining the working system switching in a first embodiment of the present invention.

FIG. 1 is a timing diagram for explaining the working system switching in a first embodiment of the present invention. For the sake of convenience, it is assumed that monitoring control information is exchanged via a network between a monitoring control apparatus $12_0$ of a working (or active) system #0 and a monitored control apparatus 11. Control information is transmitted from the monitoring control apparatus $12_0$ of the working system #0 to the monitored control apparatus 11, and state information of the monitored control apparatus 11 is notified from the monitored control apparatus 11 to the monitoring control apparatus $12_0$ of the working system #0.

More particularly, as shown in FIG. 1, a step (1-1) transmits a monitoring information read instruction from the monitoring control apparatus $12_0$ of the working system #0, and a step (1-2) transmits monitored information from the monitored control apparatus 11. In addition, steps (1-3), (1-5), . . . transmit control instructions from the monitoring control apparatus $12_0$ of the working system #0, and steps (1-4), (1-6), . . . transmit control responses from the monitored control apparatus 11 in response to the transmit control instructions.

Hence, an operator can remotely monitor the state of the monitored control apparatus 11 in the communication network using the monitoring control apparatus $12_0$ of the working system #0, and monitor and control the state of the monitored control apparatus 11 by sending control instructions for controlling the operation and the like of the monitored control apparatus 11. As a result, it is possible to provide a stable communication service.

If a failure is generated in the monitoring control apparatus $12_0$ of the working system #0 in a step (1-7) and it becomes impossible to communicate between the monitoring control apparatus $12_0$ and the monitored control apparatus 11, the monitored control apparatus 11 detects in a step (1-8) that the communication between the monitored control apparatus 11 and the monitoring control apparatus $12_0$ of the working system #0 is disconnected.

In the monitored control apparatus 11, an address of a monitoring control apparatus $12_1$ of a backup (or standby) system #1 is set in advance together with an address of the monitoring control apparatus $12_0$ of the working system #0. Hence, when the disconnection of the communication between the monitored control apparatus 11 and the monitoring control apparatus $12_0$ of the working system #0 is detected, the step (1-8) switches the address to which the monitored control apparatus 11 is connected by referring to the set addresses.

Based on the switched address to which the monitored control apparatus 11 is connected, the monitored control apparatus 11 makes a connection to the monitoring control apparatus $12_1$ of the backup system #1 in a step (1-9). When a communication between the monitored control apparatus 11 and the monitoring control apparatus $12_1$ of the backup system #1 is established in a step (1-10), the monitoring control apparatus $12_1$ of the backup system #1 transmits a monitoring information read instruction to the monitored control apparatus 11 in a step (1-11), and transmits a control information read instruction to the monitored control apparatus 11 in a step (1-13).

With respect to the monitored information read instruction, the monitored control apparatus 11 transmits the monitored information to the monitoring control apparatus $12_1$ of the backup system #1 in a step (1-12). In addition, with respect to the control information read instruction, the monitored control apparatus 11 transmits to the monitoring control apparatus $12_1$ of the backup system #1, together with a response thereto, contents of the control carried out by the monitoring control apparatus $12_0$ of the working system #0 up to that time, in a step (1-14).

Based on the control information transmitted from the monitored control apparatus 11, the monitoring control apparatus $12_1$ of the backup system #1 judges whether or not a control operation is interrupted by the generation of the failure. If an interrupted control operation exists, the monitoring control apparatus $12_1$ of the backup system #1 continues the interrupted control operation in steps (1-15), (1-17), . . . . With respect to the control operation which is continued by the monitoring control apparatus $12_1$ of the backup system #1, the monitored control apparatus 11 transmits a response similarly to the response with respect to the monitoring control apparatus $12_0$ of the working system #0, in steps (1-16), (1-18), . . . .

In the particular case shown in FIG. 1, the failure is generated when the monitoring control apparatus $12_0$ of the working system #0 transmits up to the second control instruction of the n control instructions. Hence, the monitoring control apparatus $12_1$ of the backup system #1 continues the control operation by taking over the control operation after the failure is generated, that is, taking over the transmission of the second and subsequent control instructions. In FIG. 1, (1/n), (2/n), . . . indicate the first, second, . . . of the n control instructions or the n control responses.

Therefore, when the failure is generated in the monitoring control apparatus of the working system, the system is switched to the monitoring control apparatus of the backup system. Hence, the monitoring and control operation is taken over by the monitoring control apparatus of the backup system from the monitoring control apparatus of the working system, and the monitored control apparatus, that is, each communication apparatus in the communication network, is monitored and controlled without interruption.

Figure 2:
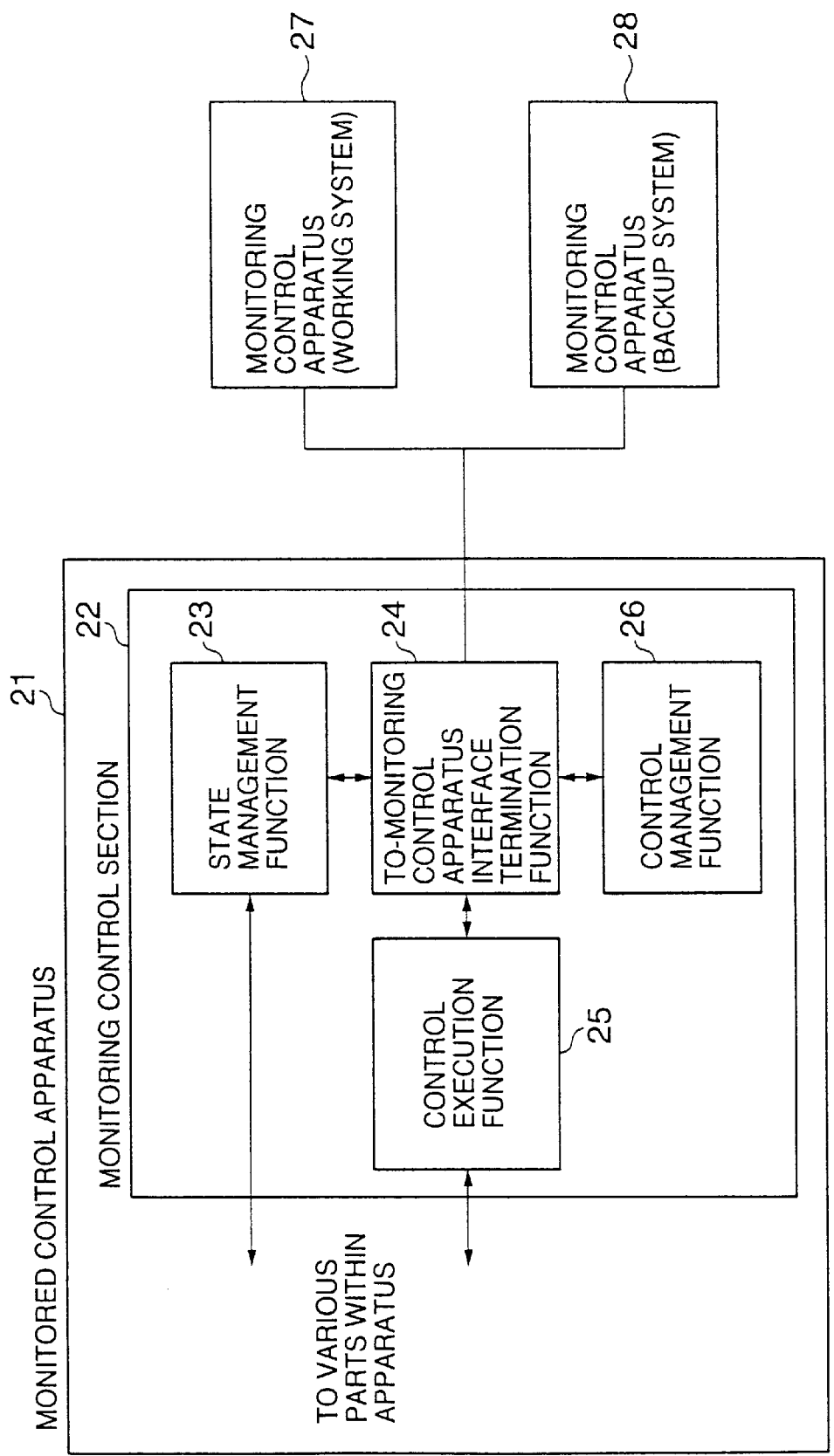
FIG. 2 is a functional block diagram showing a monitoring control section of a monitored control apparatus according to the present invention.

FIG. 2 is a functional block diagram showing a monitoring control section of a monitored control apparatus according to the present invention. Normally, a monitored control apparatus 21 such as a communication apparatus which forms a communication network, is provided with a monitoring control section 22 which monitors and controls the state of the monitored control apparatus 21 to which this monitoring control section 22 belongs. The monitoring control section 22 includes a state management function 23, a to-monitoring control apparatus interface termination function 24, and a control execution function 25.

The state management function 23 manages the states of each of the parts within the monitored control apparatus 21, and notifies state information to the to-monitoring control apparatus interface termination function 24. The to-monitoring control apparatus interface termination function 24 notifies the state information to a monitoring control apparatus 27 of the working system, and notifies a control instruction to the control execution function 25 in response to the control instruction from the monitoring control apparatus 27 of the working system.

In addition, the to-monitoring control apparatus interface termination function 24 monitors whether the communication between the monitored control apparatus 21 and the monitoring control apparatus 27 of the working system is normal or abnormal. In addition, in order to communicate with a plurality of control apparatuses including a monitoring control apparatus 28 of the backup system, the to-monitoring control apparatus interface termination function 24 holds addresses of the plurality of monitoring control apparatuses.

The control execution function 25 receives the control instruction from the monitoring control apparatus 27 of the working system via the to-monitoring control apparatus interface termination function 24, and controls the operations and states of each of the parts within the monitored control apparatus 21.

In this first embodiment of the present invention described above, the control management function 26 which includes a storage unit is provided within the monitoring control section 22 of the monitored control apparatus 21, and the control instruction from the monitoring control apparatus 27 of the working system is successively stored in the storage unit. The stored contents are notified to the monitoring control apparatus 28 of the backup system in response to a control information read request which is received from the monitoring control apparatus 28 of the backup system via the to-monitoring control apparatus interface termination function 24.

The monitoring control apparatus 28 of the backup system makes the control information read request with respect to the monitored control apparatus 21 when connected to the monitored control apparatus 21. The control information includes information related to the type of control instructed from the monitoring control apparatus 27 of the working system, whether or not the control is completed or in progress, and if in progress which part of the control has been carried out.

The monitored control apparatus 21 notifies the control information which is stored in the control management function 26 to the monitoring control apparatus 28 of the backup system via the to-monitoring control apparatus interface termination function 24. The monitoring control apparatus 28 of the backup system recognizes the contents of the control carried out by the monitoring control apparatus 27 of the working system up to the time immediately before receiving the notification.

The monitoring control apparatus 28 of the backup system takes over and continues the control carried out by the monitoring control apparatus 27 of the working system, via a connection which is established between the monitoring control apparatus 28 of the backup system and the monitored control apparatus 21.

The to-monitoring control apparatus interface termination function 24 holds an address (ADDRESS_ACT) of the monitoring control apparatus 27 of the working system which is presently connected, and an address (ADDRESS_SBY) of the monitoring control apparatus 28 of the backup system.

When the to-monitoring control apparatus interface termination function 24 detects the disconnection of the connection between the monitored control apparatus 21 and the monitoring control apparatus 27 of the working system, the to-monitoring control apparatus interface termination function 24 switches the connecting address from the address of the monitoring control apparatus 27 of the working system to the address of the monitoring control apparatus 28 of the backup system, so as to establish a connection to the monitoring control apparatus 28 of the backup system. The to-monitoring control apparatus interface termination function 24 transmits the monitored information and the control information described above in response to the control information read request from the monitoring control apparatus 28 of the backup system.

Next, a description will be given of a second embodiment of the present invention. In the first embodiment described above, the control management function 26 is provided within the monitored control apparatus 21, the control information from the monitoring control apparatus 27 of the working system is stored by the control management function 26, and the stored contents are notified to the monitoring control apparatus 28 of the backup system so as to transfer the control information to the monitoring control apparatus 28 of the backup system. However, it is possible to transfer the control information by constantly notifying the control information from the monitoring control apparatus 27 of the working system to the monitoring control apparatus 28 of the backup system.

In other words, in this second embodiment of the present invention, the monitoring control apparatus 27 of the working system transmits a control instruction to the monitored control apparatus 21, and also transmits the same control instruction to the monitoring control apparatus 28 of the backup system. The monitoring control apparatus 28 of the backup system constantly receives the control instruction from the monitoring control apparatus 27 of the working system, and similarly to the control management function 26 described above, the monitoring control apparatus 28 of the backup system includes the functions of storing a history of the control information which includes information related to the type of control instructed from the monitoring control apparatus 27 of the working system, whether or not the control is completed or in progress, and if in progress which part of the control has been carried out.

In addition, the monitoring control apparatus 28 of the backup system holds an address (ADDRESS_MANAGED) of the monitored control apparatus 21 in addition to the address (ADDRESS_ACT) of the monitoring control apparatus 27 of the working system.

Normally, when a failure is generated in the monitoring control apparatus 27 of the working system and the connection between the monitoring control apparatus 27 of the working system and the monitored control apparatus 21 becomes disconnected, the connection between the monitoring control apparatus 27 of the working system and the monitoring control apparatus 28 of the backup system also becomes disconnected.

The monitoring control apparatus 28 of the backup system recognizes that the connection to the monitoring control apparatus 27 of the working system is disconnected, and establishes a connection to the monitored control apparatus 21 in response to this recognition. Thus, similarly to the first embodiment described above, the monitoring control apparatus 28 of the backup system takes over the control carried out by the monitoring control apparatus 27 of the working system. As a result, the monitored control apparatus 21 is automatically restored to the normal monitored state, and is monitored by the monitoring control apparatus 28 of the backup system.

Figure 3:
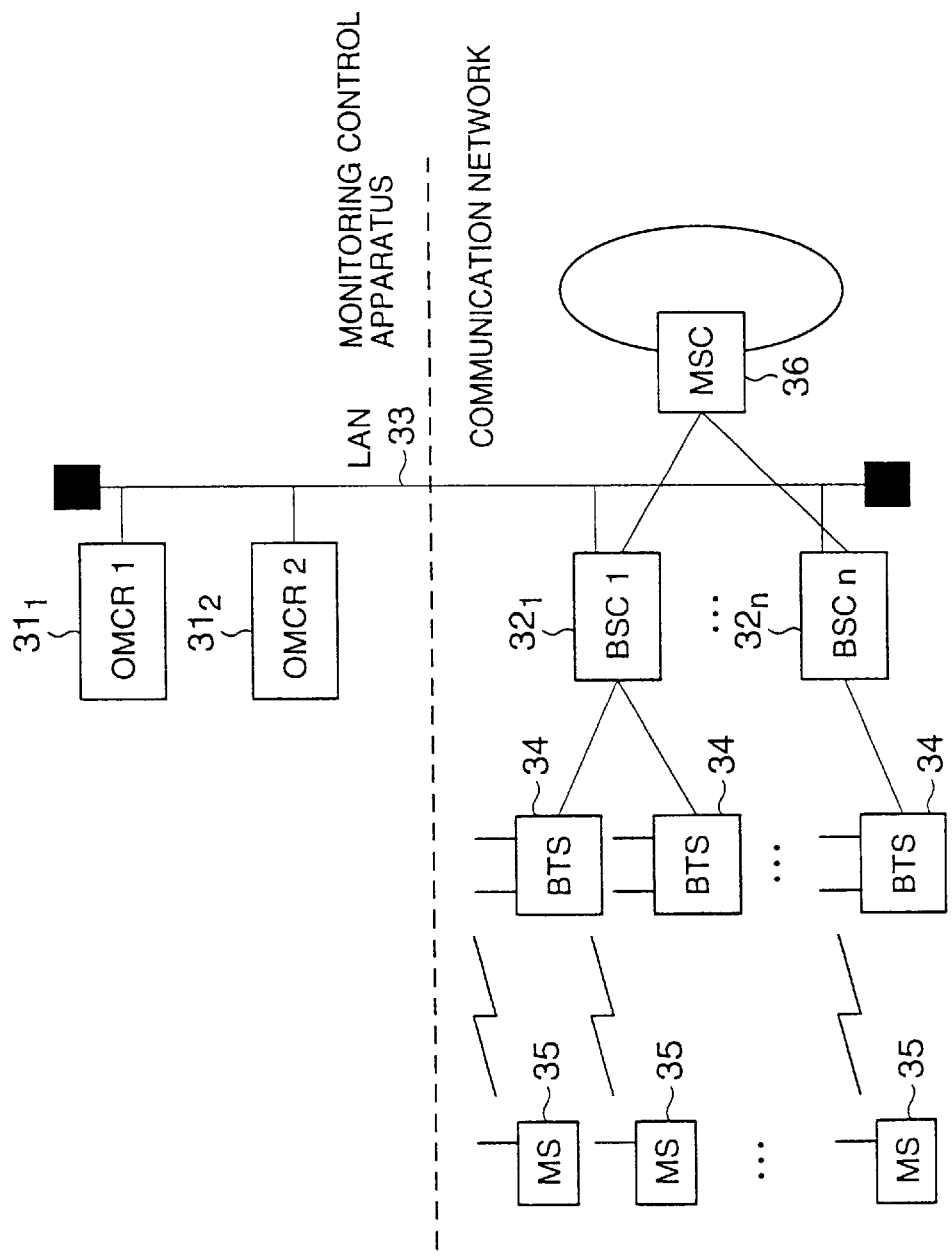
FIG. 3 is a system block diagram showing a mobile communication system applied with the present invention.

Next, a description will be given of embodiments which are applied with the working system switching of the present invention. FIG. 3 is a system block diagram showing a mobile communication system applied with the present invention. In FIG. 3, a radio station maintenance and operation apparatuses (hereinafter referred to as an Operation and Maintenance Center Radios or simply OMCRs) $31_1$ and $31_2$ respectively correspond to the monitoring control apparatus described above, and a plurality of Base Station Controllers (BSCs) $32_1$ through $32_2$ respectively correspond to the monitored control apparatus described above. The OMCRs $31_1$ and $31_2$ remotely collect state information of each apparatus, with respect to the BSCs $32_1$ through $32_n$ and apparatuses which serve under the BSCs $32_1$ through $32_n$. The OMCRs $31_1$ and $31_2$ also control the operation or state of such apparatuses.

The BSCs $32_1$ through $32_n$ and the OMCRs $31_1$ and $31_2$ are connected via a Local Area Network (LAN) 33, and exchange monitored information and the control information using a TCP/IP-based protocol.

In order to exchange the above information on the LAN 33, it is a condition that a TCP connection is established. Equipments connected to the LAN 33 each have an individual IP address assigned thereto, and each equipment holds an IP address of each communication destination in order to establish the TCP connection.

The BSCs $32_1$ through $32_n$ respectively manage the state thereof and the state of each Base station Transceiver Subsystem (BTS) 34 which serves thereunder. The BSCs $32_1$ through $32_n$ have the function of notifying such state information to the OMCRs $31_1$ and $31_2$ independently or, in response to requests from the OMCRs $31_1$ and $31_2$.

The BTS 34 transmits communication information between a Mobile Station (MS) 35 via a radio channel, and relays the communication information to a Mobile Switching Center (MSC) 36 via the BSCs $32_1$ through $32_n$.

Figure 4:
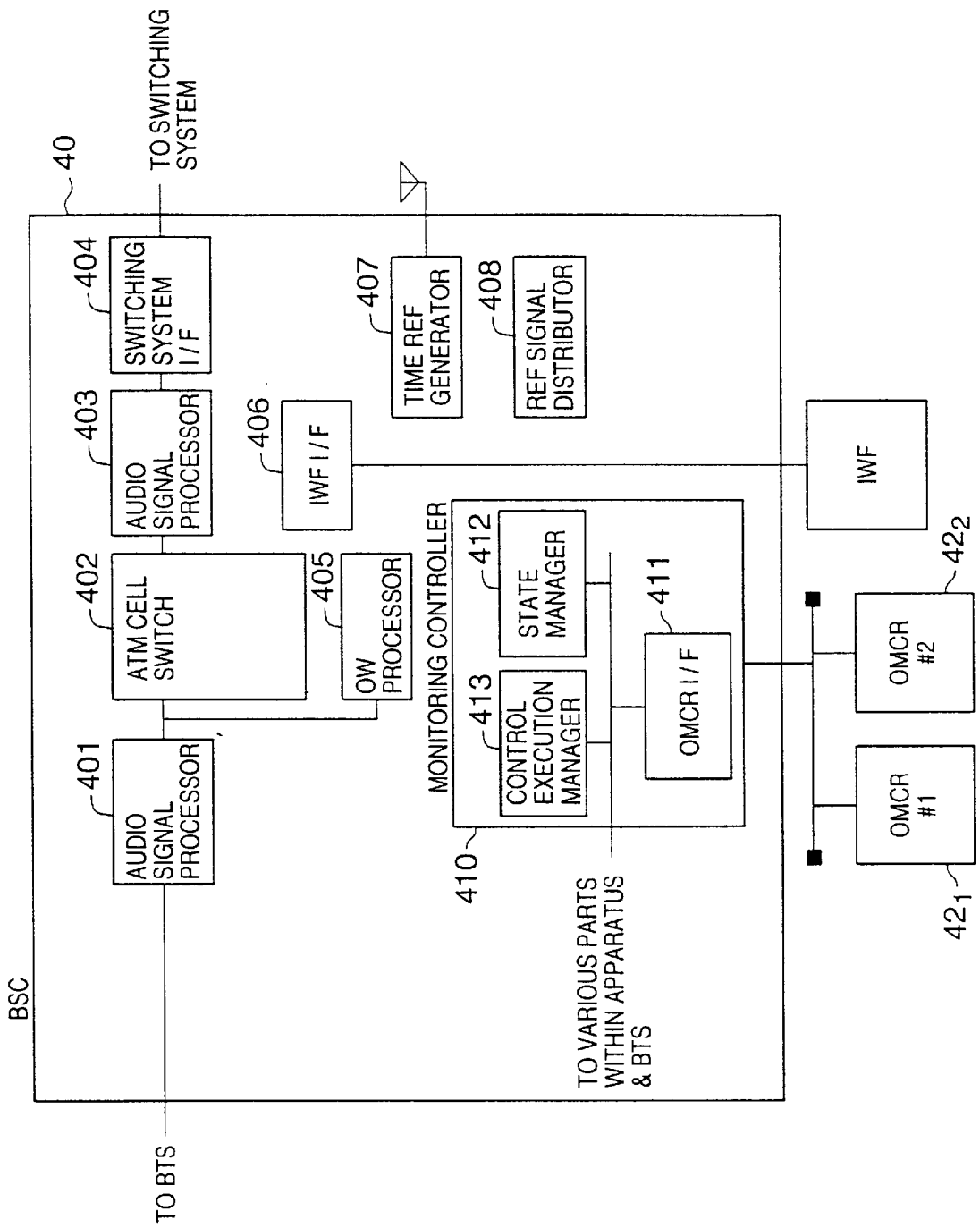
FIG. 4 is a functional block diagram showing a base station controller of the present invention.

FIG. 4 is a functional block diagram showing the base station controller (BSC) of the present invention. A BSC 40 shown in FIG. 4 includes an audio signal processor 401 for processing audio signals to and from a BTS, an ATM cell switch 402, an audio signal processor 403 for processing audio signals to and from a switching system, a switching system interface 404, an Order Wire (OW) processor 405, an InterWorking Function (IWF) interface 406, a time reference generator 407, a reference signal distributor 408, and a monitoring controller 410.

The monitoring controller 410 includes an OMCR interface 411, a state manager 412, and a control execution manager 413. The OMCR interface 411 has the functions of establishing a communication between the BSC 40 and an OMCR $42_1$ or $42_2$, and detecting a disconnection of the communication.

The state manager 412 has the function of collecting and managing state information of the parts within the BSC 40 and each apparatus such as the BTS which serves under the BSC 40. In addition, the state manager 412 has the function of notifying the state information to the OMCR $42_1$ or $42_2$ independently or, in response to a request from the OMCR $42_1$ or $42_2$.

The control execution manager 413 has the functions of controlling the parts within the BSC 40 and each apparatus such as the BTS which serves under the BSC 40, based on a control instruction from the OMCR $42_1$ or $42_2$, and managing control states of the parts within the BSC 40 and each apparatus such as the BTS.

Figure 5:
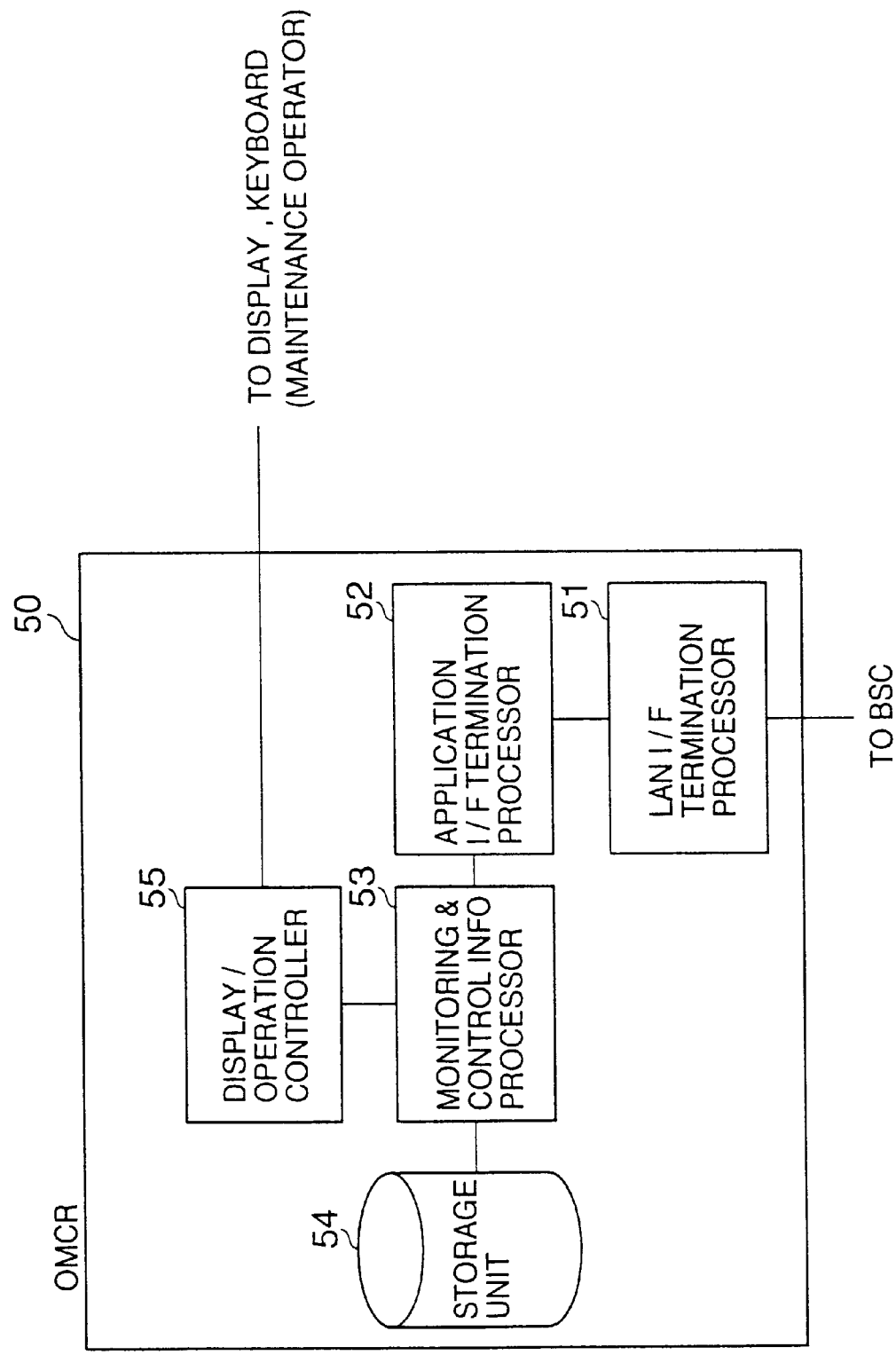
FIG. 5 is a functional block diagram showing an operation and maintenance center radio according to the present invention.

FIG. 5 is a functional block diagram showing the operation and maintenance center radio (OMCR) according to the present invention. An OMCR 50 shown in FIG. 5 includes a LAN interface termination processor 51, an application interface termination processor 52, a monitoring and control information processor 53, a storage unit 54, and a display/operation controller 55.

The LAN interface termination processor 51 has the functions of establishing a communication between the OMCR 50 and the BSC, and detecting a disconnection of the communication. The application interface termination processor 52 has the function of terminating the state information and the control information exchanged between the BSC and the monitoring control information processor 53.

The monitoring control processor 53 stores information collected from the monitored control apparatus into the storage unit 54, and carries out a process of transferring a control instruction from a maintenance operator to the monitored control apparatus. The display/operation controller 55 has the functions of displaying the information collected from the monitored control apparatus, identifying a control instruction operation and the like from the maintenance operator, and notifying the information to the monitoring and control processor 53.

Next, a description will be given of the switching of the working system in the first embodiment of the present invention by the OMCR and the BSC having the functional blocks described above.

As shown in FIG. 6, OMCRs OMCR1 and OMCR2 and BSCs BSC1 through BSCn each hold an IP address thereof and an IP address of each communication destination, that is, the IP address of each party to which the connection is to be made. Priorities #1 and #2 are assigned to the IP addresses of the OMCRs OMCR1 and OMCR2 which are held by the BSCs BSC1 through BSCn which are monitored controlled apparatuses.

For the sake of convenience, it is assumed that the first OMCR OMCR1 operates as monitoring control apparatus of the working system, a TCP connection is established between the first OMCR OMCR1 and each BSC, and the first OMCR OMCR1 monitors and controls each BSC. Further, it is assumed that the second OMCR OMCR2 operates as the monitoring control apparatus of the backup system, and no TCP connection is established between the second OMCR OMCR2 and each BSC, and no direct exchange of information is made between the second OMCR OMCR2 and each BSC.

If the maintenance operator carries out an operation to download station data for the BTS to the BSC, the downloaded data are divided into packets respectively having a predetermined fixed length and transferred to each BSC from the first OMCR OMCR1.

Figure 7:
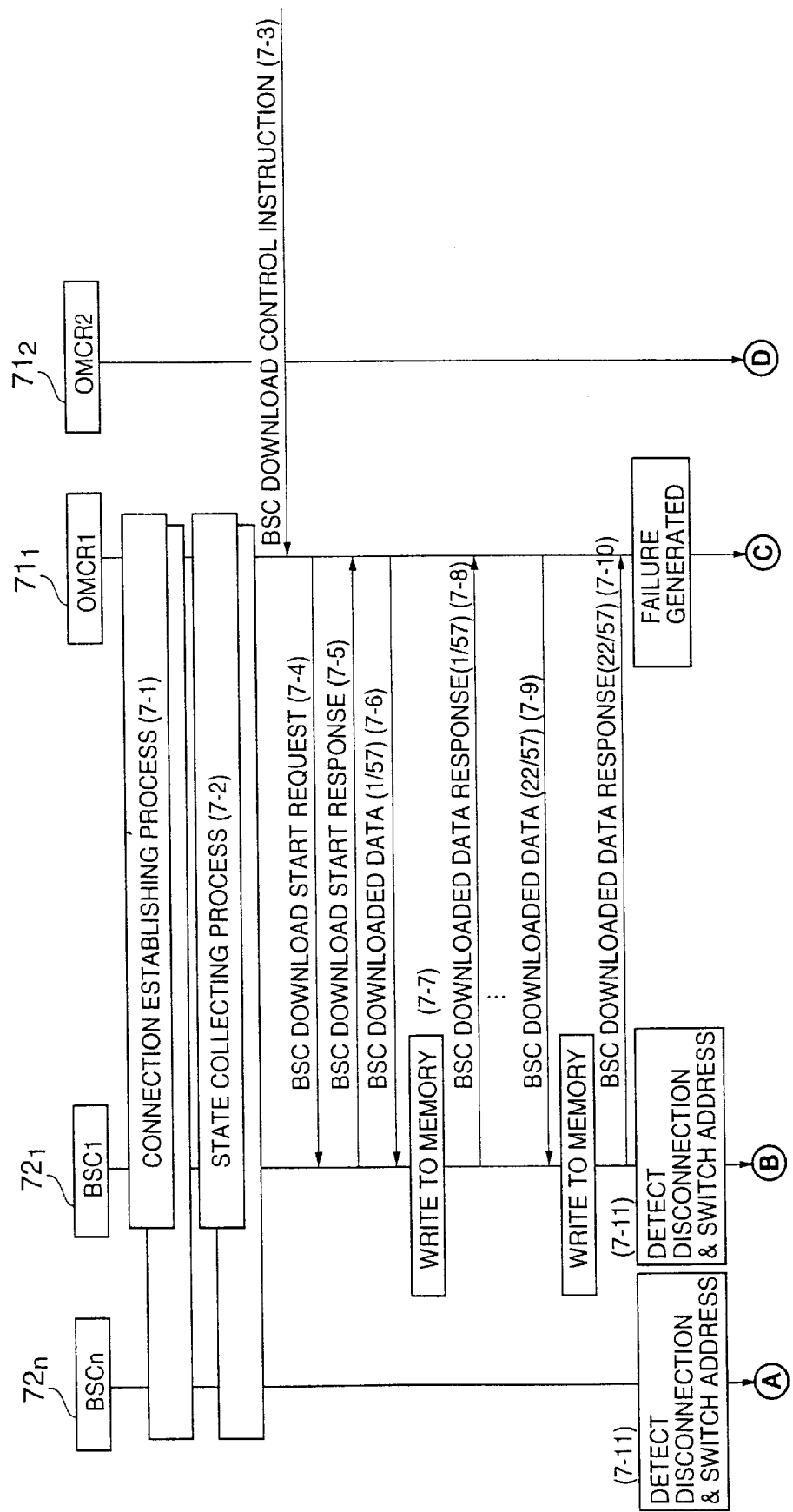
FIG. 7 is timing diagram for explaining the operation sequence of the first embodiment of the present invention.
Figure 8:
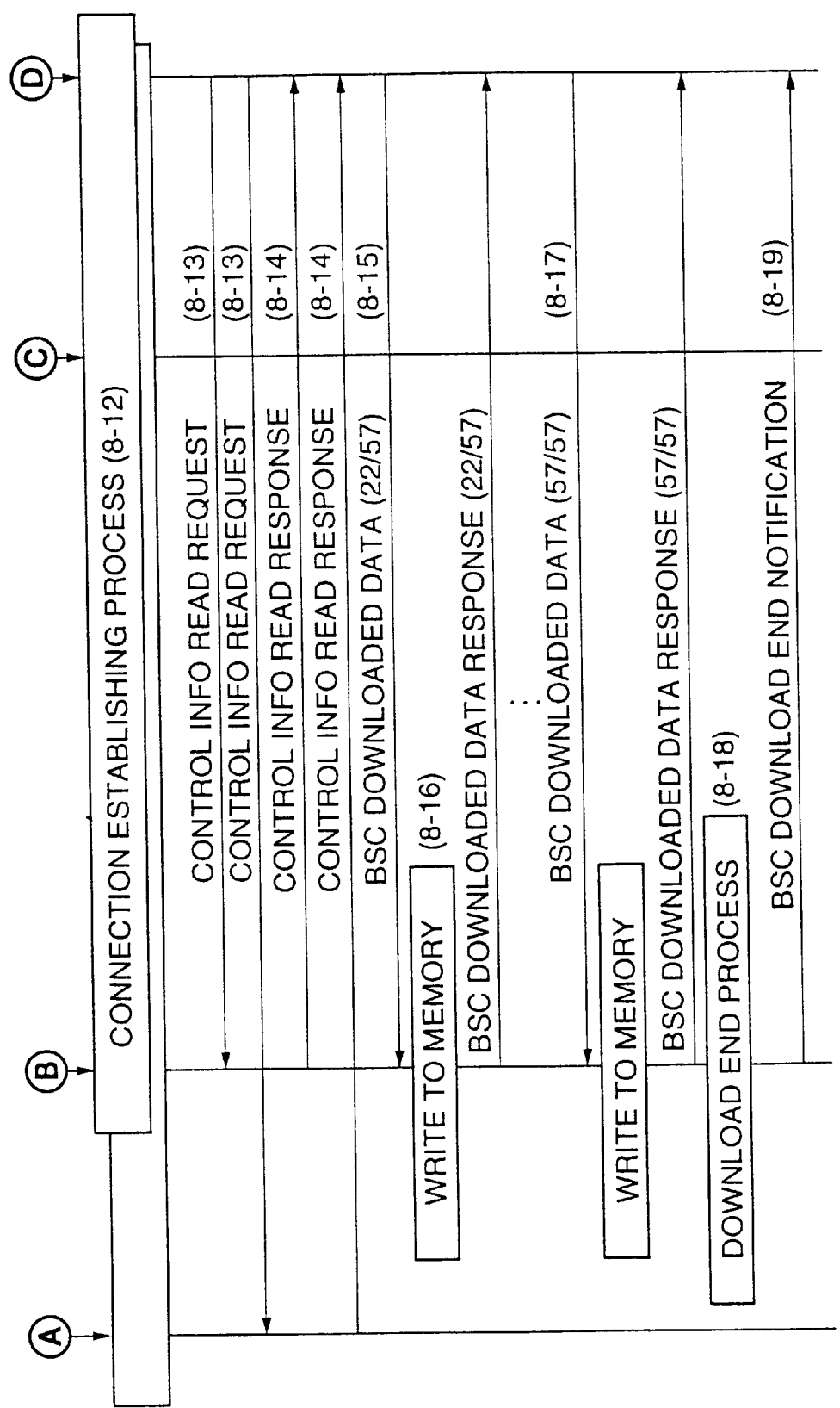
FIG. 8 is a timing diagram for explaining the operation sequence of the first embodiment of the present invention.

FIGS. 7 and 8 are timing diagrams for explaining the operation sequence of the first embodiment of the present invention. As shown in FIG. 7, a first OMCR 71, (OMCR1) carries out a connection establishing process to establish a connection between the first OMCR $71_1$ and each of BSCs $72_1$ through $72_n$ (BSC1 through BSCn) in a step (7-1), and carries out a state collecting process to collect state information of each of the BSCs $72_1$ through $72_n$ in a step (7-2).

The operator of the first OMCR $71_1$ transmits a download control instruction to the BSC $72_1$ in a step (7-3). The first OMCR $71_1$ makes a download start request to the BSC $72_1$ in a step (7-4), and the BSC $72_1$ makes a download start response to the first OMCR $71_1$ in a step (7-5).

It is assumed that the size of the station data for the BTS is such that the station data can be transferred by a total of fifty-seven packets. The first OMCR $71_1$ transmits information which indicates the total number of packets to be transferred and a position of each packet which is being transferred within the total number of packets, together with the downloaded data, to the BSC $72_1$ in a step (7-6).

The BSC $72_1$ writes the downloaded data into a memory in a step (7-7), and returns a downloaded data response to the first OMCR $71_1$ in a step (7-8).

If up to twenty-two packets are transmitted in a step (7-9), and a failure is generated in the first OMCR $71_1$ in a step (7-10), the BSCs $72_1$ through $72_n$ detect the disconnection of the TCP connection to the first OMCR $71_1$ in a step (7-11).

The BSCs $72_1$ through $72_n$ switch the IP address of the connecting destination from the IP address of the first OMCR $71_1$ of the working system to the IP address of a second OMCR 712 (OMCR2) of the backup system, and establishes a connection to the second OMCR $71_2$ of the backup system in a step (8-12) shown in FIG. 8.

When the TCP connections are established between the BSCs $72_1$ through $72_n$ and the second OMCR $71_2$ of the backup system, the second OMCR $71_2$ of the backup system transmits a control information read request to each of the BSCs $72_1$ through $72_n$ in a step (8-13). Further, the second OMCR $71_2$ acquires the type of control (that is, control type) previously carried out by the first OMCR $71_1$ of the working system with respect to each of the BSCs $72_1$ through $72_n$ and the control state of each of the BSCs $72_1$ through $72_n$ in a step (8-14).

The control information transmitted from each of the BSCs $72_1$ through $72_1$ to the second OMCR $71_2$ Of the backup system includes the following items.

① Control Type: Down load control of station data for the BTS to the BSC; and

② Control State: Incomplete (Transferring twenty-second packet (22/57) of the total of fifty-seven packets).

Based on the control information notified from the BSC $72_1$, the second OMCR $71_2$ of the backup system resumes the item ①, "down load control of station data for the BTS to the BSC", from the twenty-second packet in a step (8-15).

The BSC $72_1$ writes the downloaded data from the twenty-second packet transmitted from the second OMCR $71_2$ of the backup system into the memory, similarly to the above, in a step (8-16). The BSC $72_1$ continues to receive the downloaded data subsequent to the twenty-second packet and up to the last packet from the second OMCR $71_2$ of the backup system in a step (8-17), and the BSC $72_1$ carries out a download end process in a step (8-18). The BSC $72_1$ notifies a download end with respect to the second OMCR $71_2$ of the backup system in a step (8-19). The BSCs $72_2$ through $72_n$ other than the BSC $72_1$ operates similarly to the BSC $72_1$.

Next, a description will be given of the switching of the working system in the second embodiment of the present invention. In this embodiment, OMCRs OMCR1 and OMCR2 and BSCs BSC1 through BSCn each hold an IP address thereof and an IP address of each communication destination, that is, the IP address of each party to which the connection is to be made, as shown in FIG. 9.

Priorities #1 and #2 are assigned to the IP addresses of the OMCRs OMCR1 and OMCR2 which are held by the BSCs BSC1 through BSCn. Furthermore, the OMCRs OMCR1 and OMCR2 also hold IP addresses other OMCRs.

Figure 10:
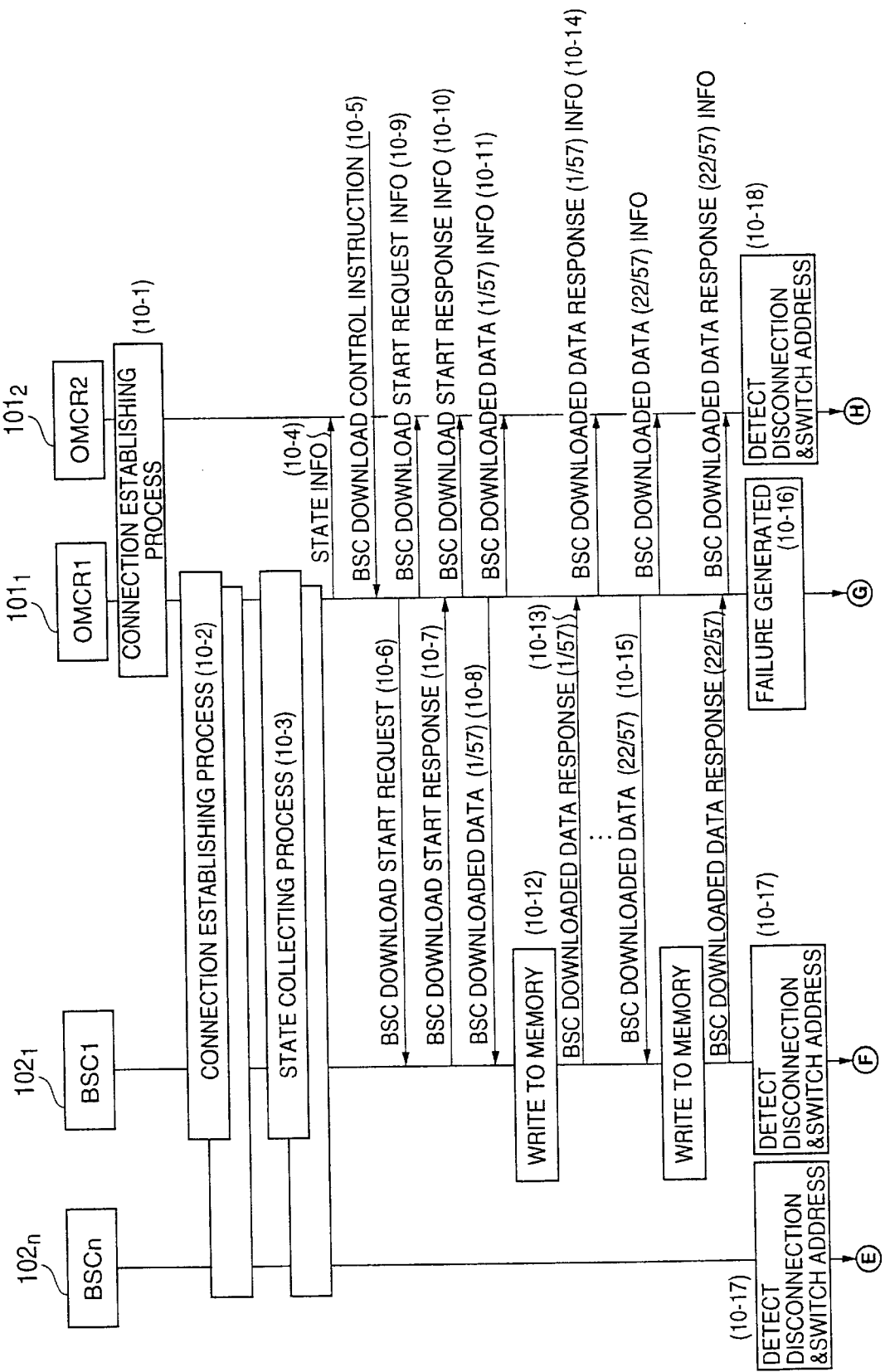
FIG. 10 is a timing diagram for explaining the operation sequence of the second embodiment of the present invention.
Figure 11:
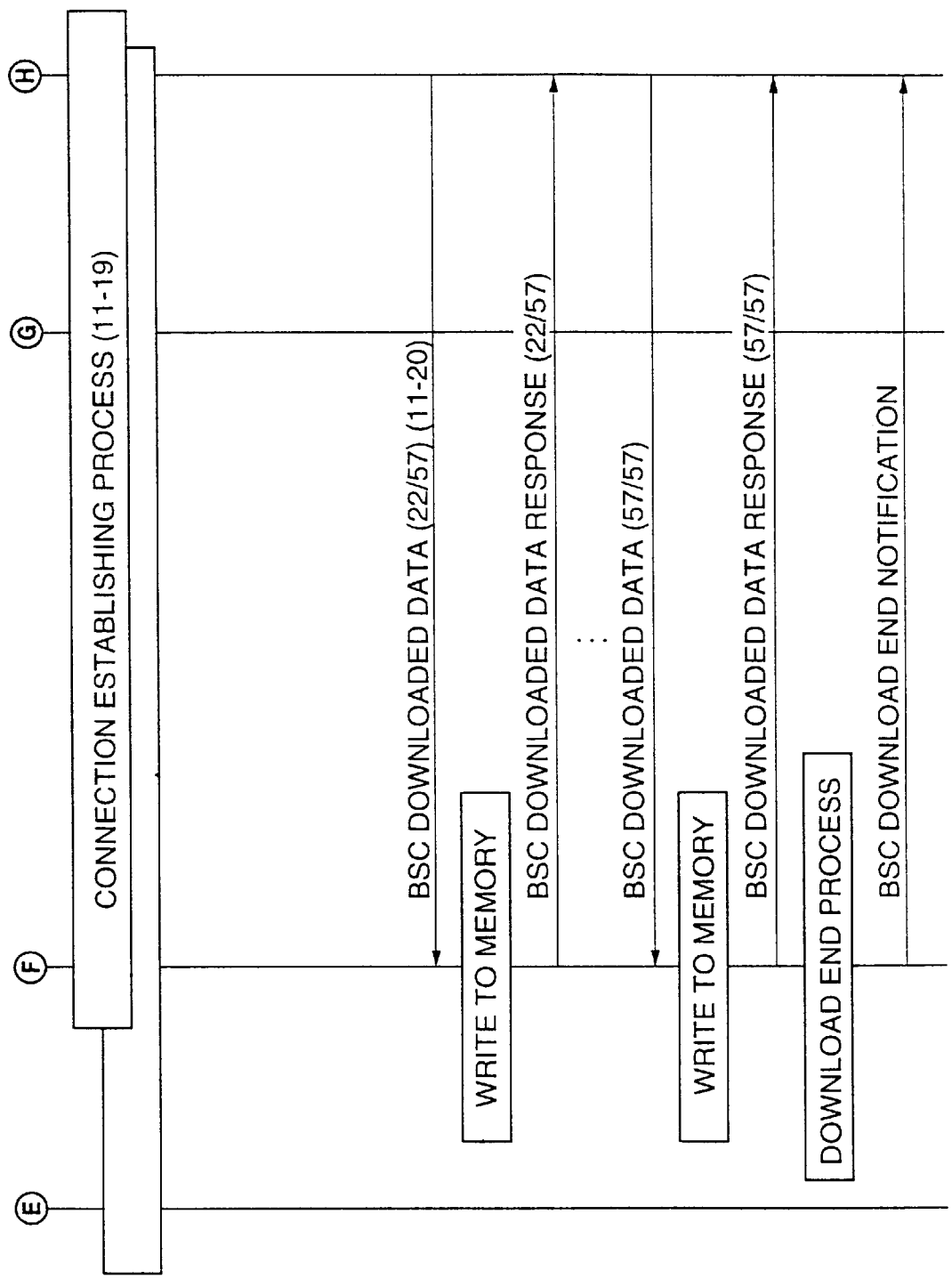
FIG. 11 is a timing diagram for explaining the operation sequence of the second embodiment of the present invention.

FIGS. 10 and 11 are timing diagrams for explaining the operation sequence of the second embodiment of the present invention. For the sake of convenience, it is assumed that a first OMCR $101_1$ (OMCR1) operates as the monitoring control apparatus of the working system. As shown in FIG. 10, the first OMCR $101_1$ (OMCR1) carries out a connection establishing process to establish a connection between the first OMCR $101_1$ and each of BSCs $102_1$ through $102_n$ (BSC1 through BSCn) in a step (10-2), and carries out a state collecting process to collect state information of each of the BSCs $102_1$ through $102_n$ in a step (10-3).

A second OMCR $101_2$ (OMCR2) operates as the monitoring control apparatus of the backup system. No TCP connection is established between the second OMCR $101_2$ and each of the BSCs $102_1$ through $102_n$. However, the second OMCR $101_2$ establishes a TCP connection between the first OMCR $101_1$ in a step (10-1), and information is exchanged between the first and second OMCRs $101_1$ and $101_2$ in a step (10-4).

In other words, the second OMCR $101_2$ can exchange information with each of the BSCs $102_1$ through $102_1$ via the first OMCR $101_1$, and the second OMCR $101_2$ can be constructed to provide the same functions as the first OMCR $101_1$ to the maintenance operator.

If the maintenance operator carries out an operation to download station data for the BTS to the BSC $101_1$ in a step (10-5), the first OMCR $101_1$ transmits a download start request to the BSC $102_1$ in a step (10-6), and the BSC $102_1$ makes a download start response to the first OMCR $101_1$ in a step (10-7).

The downloaded data are divided into packets having a predetermined fixed length, and transferred from the first OMCR $101_1$ to the BSC $102_1$. It is assumed that the size of the station data for the BTS is such that the station data can be transferred by a total of fifty-seven packets.

The first OMCR $101_1$ transmits information which indicates the total number of packets to be transferred and a position of each packet which is being transferred within the total number of packets, together with the downloaded data, to the BSC $102_1$ in a step (10-8). At the same time, the first OMCR $101_1$ transmits similar information to the second OMCR $1012_1$ in steps (10-9) through (10-11).

The BSC $102_1$ writes the downloaded data into a memory in a step (10-12), and returns a downloaded data response to the first OMCR $101_1$ in a step (10-13). The first OMCR $101_1$ transmits the same data to the second OMCR $101_2$ of the backup system in a step (10-14).

If up to twenty-two packets are transmitted in a step (10-15), and a failure is generated in the first OMCR $101_1$ in a step (10-16), the BSC 102₁ detects the disconnection of the TCP connection to the first OMCR 101₁, and switches the IP address of the connecting destination from the IP address of the first OMCR 101₁ of the working system to the IP address of the second OMCR 101₂ of the backup system, in a step (10-17).

The other BSCs 102₂ through 102₁ similarly switch the IP address of the connecting destination from the IP address of the first OMCR 101₁ of the working system to the IP address of the second OMCR 101₂ of the backup system, in a step (10-17).

At the same time, the TCP connection between the first and second OMCRs 101₁ and 101₂ is also disconnected. Hence, the second OMCR 101₂ detects the disconnection of the TCP connection to the first OMCR 101₁, and the second OMCR 101₂ switches the connecting destination from the first OMCR 101₁ to each of the BSCs 102₁ through 102₁ by referring to the table of IP addresses shown in FIG. 9, in a step (10-18). In addition, the second OMCR 101₂ establishes connections to the BSCs 102₁ through 102ₙ in a step (11-19) shown in FIG. 11.

When the TCP connections are established between the BSCs 102₁ through 102₁ and the second OMCR 101₂ of the backup system, the second OMCR 101₂ of the backup system continues to transmit the downloaded data from the twenty-second packet with respect to the BSC 102₁ by taking over the operation from the first OMCR 101₁, in a step (11-20). The operation carried out thereafter is the same as that of the first embodiment described above.

Figure 12:
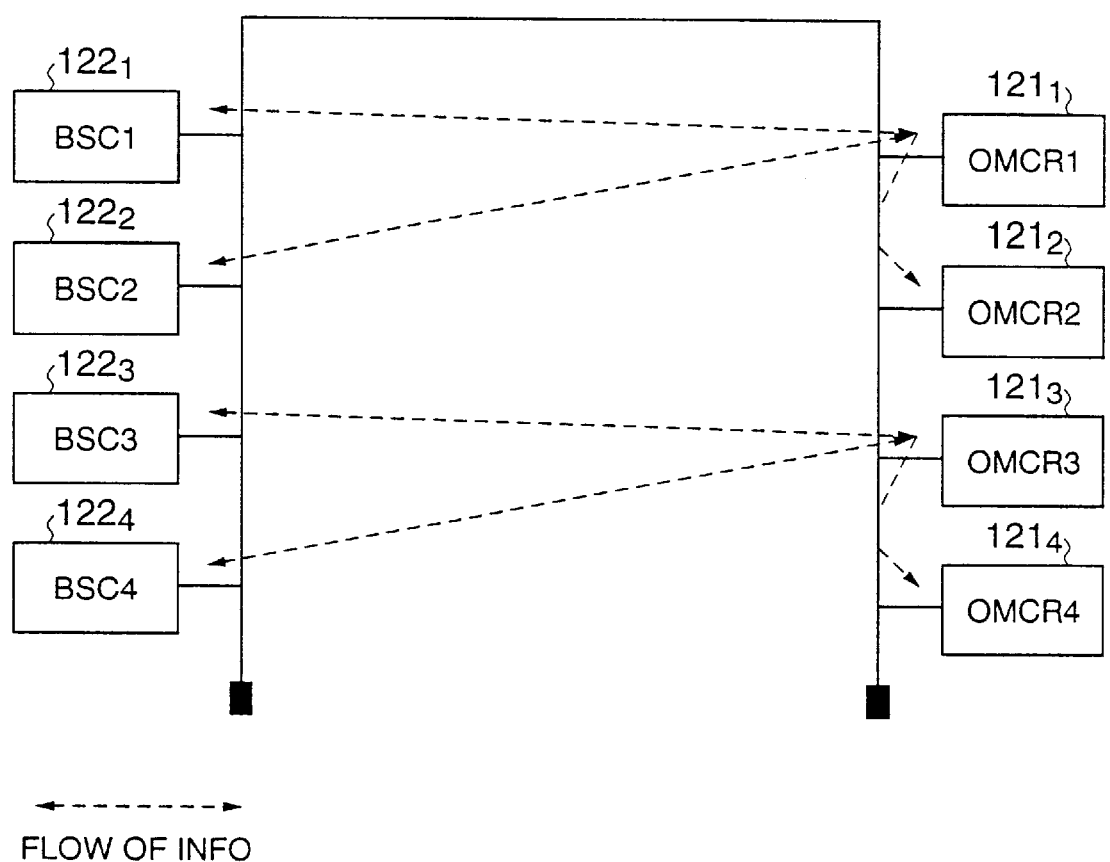
FIG. 12 is a system block diagram showing the system structure of a third embodiment of the present invention.

FIG. 12 is a system block diagram showing the system structure of a third embodiment of the present invention. This third embodiment of the present invention is provided with a plurality of BSCs 122₁ through 122₄ (BSC1 through BSC4) which are to be monitored, and a plurality of OMCRs 121₁ through 121₄ (OMCR1 through OMCR4) which establish TCP connections and exchange information directly, so as to distribute the load of the processing in the OMCR. In FIG. 12, dotted lines with arrows indicate the flow of information.

In FIG. 12, the first OMCR 121₁ establishes TCP connections with the first and second BSCs 122₁ and 122₂, and monitors the first and second BSCs 122₁ and 122₂.

The second OMCR 121₂ establishes a TCP connection with the first OMCR 121₁, and holds the same information as the first OMCR 121₁.

When a failure is generated in the first OMCR 121₁, the second OMCR 121₂ takes over the control operation of the first OMCR 121₁, similarly to the second embodiment described above.

Similarly, the third OMCR 121₃ establishes TCP connections with the third and fourth BSCs 122₃ and 122₄, and monitors the third and fourth BSCs 122₃ and 122₄.

The fourth OMCR 121₄ establishes a TCP connection with the third OMCR 121₃, and holds the same information as the third OMCR 121₃.

When a failure is generated in the third OMCR 121₃, the fourth OMCR 121₄ takes over the control operation of the third OMCR 121₃, similarly to the second embodiment described above.

Although only four OMCRs are shown in FIG. 12, it is of course possible to provide more than four OMCRs. In addition, the OMCR of the working system directly exchanges the information with the BSC, and four OMCRs are provided in FIG. 12 to distribute the load of the processing. Hence, it is of course possible to provide only one OMCR as in the second embodiment described above or, to provide three or more OMCRs.

Figure 13:
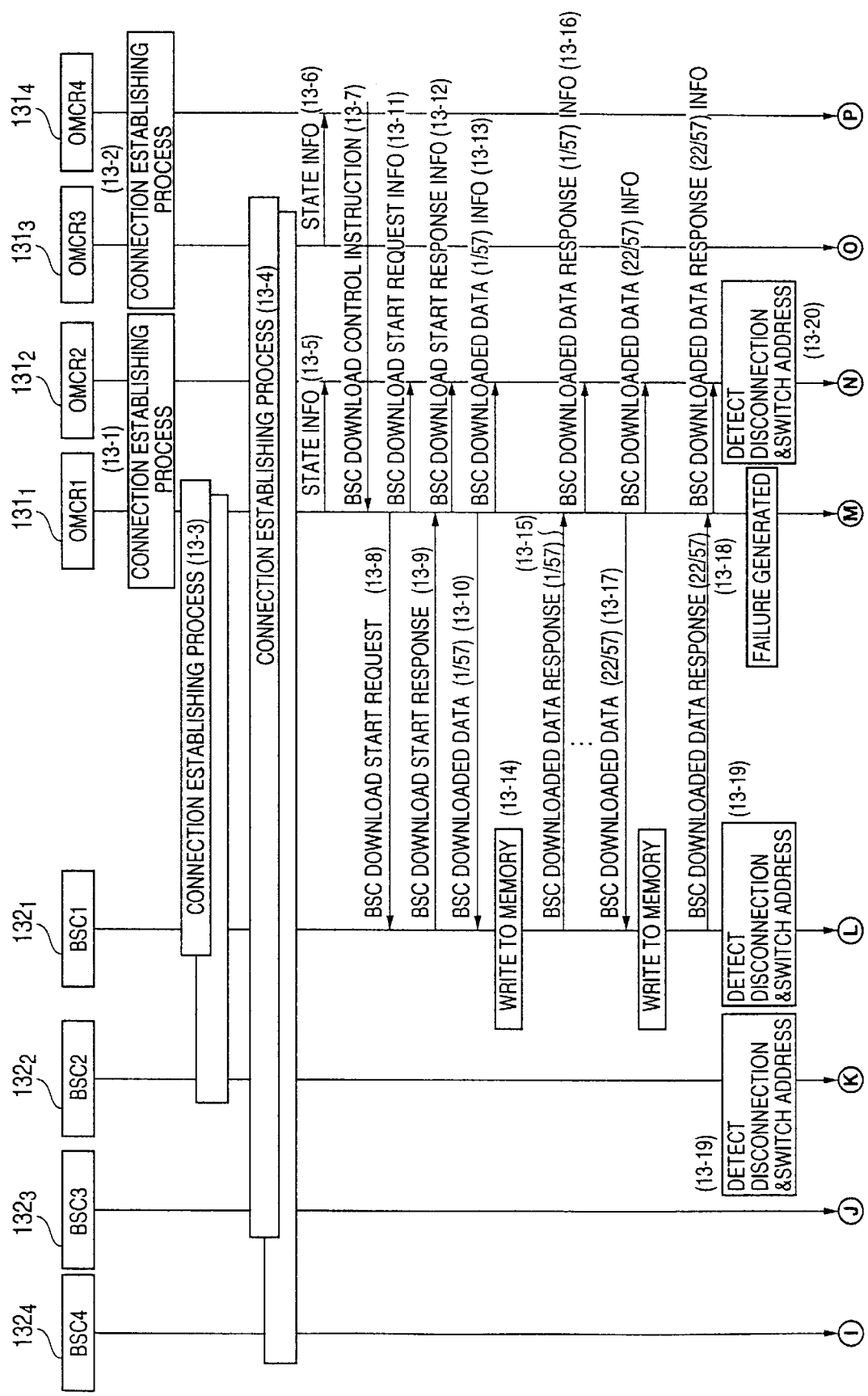
FIG. 13 is a timing diagram for explaining the operation sequence of the third embodiment of the present invention.

FIGS. 13 and 14 are timing diagrams for explaining the operation sequence of the third embodiment of the present invention. In FIG. 13, a TCP connection is established between the first OMCR 131₁ and the second OMCR 131₂ in a step (13-1), and a TCP connection is established between the third OMCR 131₃ and the fourth OMCR 131₄ in a step (13-2).

For the sake of convenience, it is assumed that the first OMCR 131₁ is the monitoring control apparatus of the working system. A TCP connection is established between the first and second BSCs 132₁ and 132₂ in a step (13-3). State collecting processes are carried out from the first and second BSCs 132₁ and 132₂, and the state information is notified to the second OMCR 131₂ in a step (13-5).

For the sake of convenience, it is assumed that the third OMCR 131₃ is the monitoring control apparatus of the working system. A TCP connection is established between the third and fourth BSCs 132₃ and 132₄ in a step (13-4). State collecting processes are carried out from the third and fourth BSCs 132₃ and 132₄, and the state information is notified to the fourth OMCR 131₄ in a step (13-6).

If the maintenance operator carries out an operation to download station data for the BTS to the first BSC 132₁ in a step (13-7), the first OMCR 131₁ transmits a download start request to the first BSC 132₁ in a step (13-8), and the first BSC 132₁ makes a download start response to the first OMCR 131₁ in a step (13-9).

The downloaded data are divided into packets having a predetermined fixed length, and transferred from the first OMCR 131₁ to the first BSC 132₁. It is assumed that the size of the station data for the BTS is such that the station data can be transferred by a total of fifty-seven packets.

The first OMCR 131₁ transmits information which indicates the total number of packets to be transferred and a position of each packet which is being transferred within the total number of packets, together with the downloaded data, to the first BSC 132₁ in a step (13-10). At the same time, the first MCR 131₁ transmits similar information to the second OMCR 131₂₁ in steps (13-11) through (13-13).

The first BSC 132₁ writes the downloaded data into a memory in a step (13-14), and returns a downloaded data response to the first OMCR 131₁ in a step (13-15). The first OMCR 131₁ transmits the same data to the second OMCR 131₂ of the backup system in a step (13-16).

If up to twenty-two packets are transmitted in a step (13-17), and a failure is generated in the first OMCR 131₁ in a step (13-18), the first BSC 132₁ detects the disconnection of the TCP connection to the first OMCR 131₁, and switches the IP address of the connecting destination from the IP address of the first OMCR 131₁ of the working system to the IP address of the second OMCR 131₂ of the backup system, in a step (13-19).

The other second BSC 132₂ similarly switches the IP address of the connecting destination from the IP address of the first OMCR 131₁ of the working system to the IP address of the second OMCR 131₂ of the backup system, in a step (13-19).

At the same time, the TCP connection between the first and second OMCRs 131₁ and 131₂ is also disconnected. Hence, the second OMCR 131₂ detects the disconnection of the TCP connection to the first OMCR 131₁, and the second OMCR 131₂ switches the connecting destination from the first OMCR 131₁ to each of the first and second BSCs 132₁ and 132₂ by referring to the table of IP addresses, in a step (13-20). In addition, the second OMCR 131₂ establishes connections to the first and second BSCs 132₁ and 132₂ in a step (14-21) shown in FIG. 14.

When the TCP connections are established between the first and second BSCs $132_1$ and $132_2$ and he second OMCR $131_2$ of the backup system, the second OMCR $131_2$ of the backup system continues to transmit the downloaded data from the twenty-second packet with respect to the first BSC $132_1$ by taking over the operation from the first OMCR $131_1$, in a step (14-22). The operation carried out thereafter is the same as that of the second embodiment described above.

The third OMCR $131_3$ continues to monitor the third and fourth BSCs $132_3$ and $132_4$ even when a failure is generated in the first OMCR $131_1$.

In other words, the first and third OMCRs $131_1$ and $131_3$ carry out a load distributing process with respect to the BSC, and operate independently of each other, such that one is unaffected by the failure of the other. As a result, the reliability of the system is improved, and the circuit scale of the OMCR can be set to an arbitrary optimum scale.

In the embodiment described above, the first and second BSCs BSC1 and BSC2 are connected to the first OMCR OMCR1, the third and fourth BSCs BSC3 and BSC4 are connected to the third OMCR OMCR3, the second OMCR OMCR2 is used as the backup system for the first OMCR OMCR1, and the fourth OMCR OMCR4 is used as the backup system for the third OMCR OMCR3. However, the corresponding relationships of the working and backup systems are not limited to those of the embodiment.

For example, it is possible to construct the system so that, if both the first and second OMCRs OMCR1 and OMCR2 which monitor and control the first and second BSCs BSC1 and BSC2 fail, the third and fourth OMCRs OMCR3 and OMCR4 operate in place of the first and second OMCRs OMCR1 and OMCR2.

In addition, the monitoring and control of the first and second BSCs BSC1 and BSC2 can be carried out by using the first OMCR OMCR1 as the working system and the third OMCR OMCR3 as the backup system.

Therefore, in the monitoring and control employing the distributed load, the OMCR which is forced to operate in only one system can be appropriately backed up by the OMCR of another working or backup system which is used as a new backup system. Hence, the flexibility and safety or reliability of the system are improved.

Next, a description will be given of a case where the first OMCR OMCR1 which monitors and controls the first and second BSCs BSC1 and BSC2 fails, the second OMCR OMCR2 also fails, and the third and fourth OMCRs OMCR3 and OMCR4 take over the operations of the first and second OMCRs OMCR1 and OMCR2 to monitor and control the first and second BSCs BSC1 and BSC2.

First, the first OMCR OMCR1 is connected to the first and second BSCs BSC1 and BSC2, and carries out the monitoring and control thereof. But when the first OMCR OMCR1 fails, the second OMCR OMCR2 takes over the monitoring and control of the first and second BSCs BSC1 and BSC2.

Second, at the time when the second OMCR OMCR2 becomes the working system, the third OMCR OMCR3 becomes the backup system with respect to the second OMCR OMCR2. The second OMCR OMCR2 starts to transfer the monitored information and the control information exchanged between the second OMCR OMCR2 and the first and second BSCs BSC1 and BSC2 to the third OMCR OMCR3.

Third, if the second OMCR OMCR2 thereafter fails before the failed first OMCR OMCR1 is restored, the third OMCR OMCR3 takes over the monitoring and control operation of the failed second OMCR OMCR2. At this point in time, the third OMCR OMCR3 monitors and controls the first through fourth BSCs BSC1 through BSC4.

The third OMCR OMCR3 is connected to the fourth OMCR OMCR4 which is provided as the backup system for the third OMCR OMCR3. Hence, in addition to the monitored information and the control information exchanged between the third OMCR OMCR3 and the third and fourth BSCs BSC3 and BSC4, the third OMCR OMCR3 transfers the monitored information and the control information exchanged between the third OMCR OMCR3 and the first and second BSCs BSC1 and BSC2 to the fourth OMCR OMCR4.

Fourth, the fourth OMCR OMCR4 is originally provided as the backup system for the third OMCR OMCR3. Hence, if the third OMCR OMCR3 thereafter fails, the fourth OMCR OMCR4 takes over the monitoring and control of the first through fourth BSCs BSC1 through BSC4.

FIG. 15 is a diagram for explaining the corresponding relationship of the working system and the backup system of the operation and maintenance center radio (OMCR) in the third embodiment of the present invention. FIG. 15 shows a transition of the BSCs to be monitored and controlled by each OMCR, in the form of a table.

FIG. 16 is a diagram for explaining the IP addresses which are held in each operation and maintenance center radio (OMCR) in the third embodiment of the present invention. In addition, FIG. 17 is a diagram for explaining the IP addresses which are held in each base station controller (BSC) in the third embodiment of the present invention.

In the third embodiment described above, it is assumed that the failure is generated starting from the first and second OMCRs OMCR1 and OMCR2 which monitor and control the first and second BSCs BSC1 and BSC2. However, if the failure is generated in the third OMCR OMCR3 which monitors and controls the third and fourth BSCs BSC3 and BSC4, the control is successively taken over by the fourth OMCR OMCR4, the first OMCR OMCR1, and the second OMCR OMCR2, in this order.

In the embodiment described above, the present invention is applied to the monitoring control system employing the redundant structure which includes the monitoring control apparatuses in the working and backup systems. However, the present invention is of course applicable to a monitoring control system having a structure in which the monitoring control apparatuses are provided in N working systems and one backup system, where N is an integer greater than or equal to one.

Therefore, according to the present invention, the control information is transferred to one of the monitoring control apparatuses which form a redundant structure, in response to the generation of the failure in the monitoring control apparatus of the working system. In addition, the monitoring and control of the monitored control apparatus is taken over by the monitoring control apparatus of the backup system. As a result, it is possible to continue the monitoring and control of the monitored control apparatus even when the monitoring control apparatus of the working system fails, without requiring a manual operation of the maintenance operator.

Accordingly, the reliability of the monitoring control apparatus is improved according to the present invention. For example, it is possible to avoid undesirable situations where a fault is generated in the monitoring control apparatus but the failure generated in the communication system is not found and neglected for a long time or, an essential control operation is interrupted during the control. As a result, the present invention can prevent deterioration of the communication service and interruption of the communication service.

Even in a case where a failure is generated in the monitoring control apparatus during a control operation which extends for a relatively long time such as when downloading the station data, it is possible to continue the control operation without interruption, and the monitoring and control by the monitoring control apparatus can be carried out efficiently.

Further, the present invention is not limited to these embodiments, but various variations and modifications may be made without departing from the scope of the present invention.

What is claimed is:

1. A redundant monitoring control system comprising:

at least one monitored control apparatus forming a communication network;

a plurality of monitoring control apparatuses monitoring and controlling the monitored control apparatus;

means, provided mi the monitored control apparatus, for switching a monitoring and controlling of The monitored control apparatus by a monitoring control apparatus of a working system to a monitoring control apparatus of a backup system in response to a disconnection from monitoring control apparatus of the working system which is detected when the monitoring control apparatus of the working system fails;

means, provided in the monitoring control apparatus of the backup system, for recognizing a control operation carried out by the monitoring control apparatus of the working system until the switching, and carrying out a remainder of the recognized control operations with respect to the monitored control apparatus;

means, provided in the monitored control apparatus, for establishing a connection to the monitoring control apparatus of the backup system when the disconnection to the monitoring control apparatus of the working system is detected; and means, provided in the monitored control apparatus, for notifying the control operation carried out by the monitoring control apparatus of the working system until the failure to the monitoring control apparatus of the backup system.

2. The redundant monitoring control system as claimed in claim 1, wherein the plurality of monitoring control apparatuses which are provided with respect to each monitored control apparatus are grouped to distribute load of processing with respect to each monitored control apparatus.

3. The redundant monitoring control system as claimed in claim 1, comprising:

means, provided in the monitoring control apparatus of the backup system for establishing a connection to the monitoring control apparatus of the working system and successively acquiring monitored information and control information related to the monitored control apparatus from the monitoring control apparatus of the working system; and means, provided in the monitoring control apparatus of the backup system, for monitoring a state of the monitoring control apparatus of the working system, and when a failure of the monitoring control apparatus of the working system is detected establishing a connection with respect to the monitored control apparatus and taking over the control operation carried out by the monitoring control apparatus of the working system until the failure.

4. A monitoring control apparatus for monitoring and controlling a monitored control apparatus via a connection which is established between the monitoring control apparatus and the monitored control apparatus, comprising:

means for receiving control information which is related to control carried out by an other monitoring control apparatus and is notified from the monitored control apparatus; and means for taking over the control carried out by the other monitoring control apparatus based on the notified control information from the monitored control apparatus in response to detection of a disconnection of the other control apparatus by the monitored control apparatus.

5. A monitored control apparatus which establishes a connection to a monitoring control apparatus of a working system and is monitored and controlled by the monitoring control apparatus of the working system, comprising: means, provided in the monitored control apparatus, for switching a monitoring and controlling of the monitored control apparatus by a monitoring control apparatus of the working system to a monitoring control apparatus of a backup system in response to a disconnection from the monitoring control apparatus of the working system; means for establishing a connection to the monitoring control apparatus of the backup system when the disconnection of the connection to the monitoring control apparatus of the working system is detected; and means for notifying to the monitoring control apparatus of the backup system a control operation carried out by the monitoring control apparatus of the working system until the disconnection, so that monitoring and control of the monitored control apparatus may be taken over by the monitoring control apparatus of the backup system after the disconnection.

* * * * *